(12) United States Patent
Waterland (10) Patent No.: US 7,949,879 B2
(45) Date of Patent: *May 24, 2011

(54) SECURE PASSWORD ENTRY

(75) Inventor: Amos P Waterland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 12/427,904

(22) Filed: Apr. 22, 2009

(65) Prior Publication Data

US 2009/0241185 A1 Sep. 24, 2009

Related U.S. Application Data (63) Continuation of application No. 10/849,610, filed on May 20, 2004, now Pat. No. 7,539,874.

(51) Int. Cl.
*G06F 21/00* (2006.01)
(52) U.S. Cl. .......................... 713/183; 726/18; 715/780
(58) Field of Classification Search .................. 713/183; 726/18; 715/780
See application file for complete search history.

(56) References Cited

U.S. PATENT DOCUMENTS

| | | | |
|---|---|---|---|
| 5,394,471 A | 2/1995 | Ganesan et al. | |
| 5,428,349 A | 6/1995 | Baker | |
| 5,588,056 A | 12/1996 | Ganesan | |
| 6,209,102 B1 | 3/2001 | Hoover | |
| 6,209,104 B1 | 3/2001 | Jalili | |
| 6,253,328 B1 | 6/2001 | Smith, Jr. | |
| 6,980,081 B2 | 12/2005 | Anderson | |
| 7,065,786 B2 | 6/2006 | Taguchi | |
| 7,162,456 B2 | 1/2007 | De Jong | |
| 7,523,318 B2 | 4/2009 | Goal et al. | |
| 2004/0080529 A1 | 4/2004 | Wojcik | |
| 2005/0044425 A1 | 2/2005 | Hypponen | |

FOREIGN PATENT DOCUMENTS

JP 4080854 A2 7/1990

*Primary Examiner* — Kambiz Zand
*Assistant Examiner* — Amare Tabor
(74) *Attorney, Agent, or Firm* — Matthew W. Baca; Amy J. Pattillo (57) ABSTRACT

Secure password entry is facilitated by displaying a password prompt comprising a changing stream of random characters, where a particular character within the stream of random characters is displayed at a visibly detectable higher frequency. A user selects a password character by entering input to increment or decrement the particular high frequency character to reach the password character, such that any unauthorized keystroke logging to detect said password is ineffective. Once the user reaches the password character, the user provides another input indicating a selection of the current high frequency character as the password character. Once the user has selected all the characters of the password, the user enters an input indicating the password is complete and the password entry controller then passes the password to the calling layer.

16 Claims, 4 Drawing Sheets

SECURE PASSWORD ENTRY

CROSS-REFERENCE TO RELATED APPLICATIONS

This application is a continuation of commonly assigned U.S. patent application Ser. No. 10/849,610, filed May 20, 2004, which is hereby incorporated herein by reference.

BACKGROUND OF THE INVENTION

1. Technical Field

The present invention relates in general to improved password security and in particular to improved security of passwords during entry. Still more particularly, the present invention relates to defeating unauthorized keystroke logging during password entry.

2. Description of the Related Art

Within a computer system or network of computer systems, maintaining the security of information and access to that information is important. A common method for maintaining security in computer systems is through associating a particular password with a particular user and requiring the user to submit the password to receive access to information within a computer system or network of computer systems.

When setting up passwords, each computer system or network of computer systems typically assigns rules for the length of the password and the types of characters that must be included in the password. For example, it is typical to require a password to contain at least six characters and to include a mix of alphabetic characters and numeric characters.

While passwords provide a level of security to protect access to networks, applications, and data, use of passwords as a security device is easily compromised by an attacker employing keystroke logging techniques. In general, a keystroke logging technique records the keystrokes an authorized user uses to enter a password, such that an unauthorized user may then enter the password of the authorized user to access secured networks, applications, or data. As examples, keystroke logging can be performed through hardware, software, active monitoring, and passive monitoring.

As a first example, an unauthorized password logger can plant a hardware keystroke logging device inside a keyboard, attached to a keyboard cable, or interposed between the keyboard cable output socket and the computer keyboard input socket. The keystroke logging device records and timestamps all keystrokes typed at the keyboard. The unauthorized password logger can later recover the device and search the log for patterns which indicate an authentication. In a typical pattern, the string of characters typed after an authentication challenge is a password. For example, if the computer to which the keyboard is attached runs a UNIX based operating system, 'root|su|ssh|gpg' are patterns which result in an authentication challenge to which the user responds with a password. In another example, if the computer is part of an Internet café or other terminal available to multiple users, there is a pattern where the characters typed after entries of the form of "@hotmail.com" or "@yahoo.com" are typically the characters of a password. In yet another example, in computers which implement firmware-level authentication, there is a pattern where the first characters recorded after a long interval without activity are often the characters of the power-on password.

One solution to protect against unauthorized placement of hardware keystroke logging devices is physically securing computer systems so that only authorized users have physical access to the computer systems. Realistically, however, enforcing physical security can be difficult, particularly in Internet cafes and other locations where it is advantageous to allow public access to computer systems.

As a second example, an unauthorized password logger can implant keystroke logging software in the operating system or other programs of a computer system or network of computer systems. The keystroke logging software records and timestamps all or a selection of keystrokes in a log. In particular, the keystroke logging software can detect which program is receiving keystrokes and only record keystrokes received by particular programs. Like the hardware keystroke logging device, the unauthorized password logger can access the software keystroke log and detect patterns which tend to indicate entry of a password.

One solution to protect against unauthorized implanting of a keystroke logging software is through security software installed in the operating system of a computer system that prevents remote intrusions which would serve as a conduit for unauthorized keystroke logging software. A limitation to security software, however, is that the software keystroke logging controller may be implanted in a manner so as to not be detected by the current security software. For example, an authorized user of a computer system may open an email attachment that surreptitiously installs the keystroke logging software to avoid the operating system security.

As a third example, an unauthorized password logger can actively monitor keystrokes by watching over a shoulder or recording with a video camera the password keystrokes entered by a user. Keystrokes may also be actively monitored using a microphone to record the unique aural signatures of each key.

As with the prevention of hardware keystroke logging device placement, active monitoring of keystroke entry can typically only be prevented through restricting physical access to computer systems and sweeping rooms for unauthorized microphone or video equipment. This security solution is limited, however, because many computers accessible to the public cannot be subject to this type of security.

As a fourth example, an unauthorized keystroke logger can passively monitor keystrokes by snooping on electronic signals emitted by a computer system. Video display units leak electromagnetic radiation which can be used by an unauthorized logger to partially or fully reconstruct the image displayed on a computer system screen. In addition, other parts of a computer system emit signals which may be used to infer the operation of the component and access passwords. While passive monitoring can be avoided through the use of electromagnetic shielding that traps outbound electromagnetic radiation, this solution is limited because the shielding is very expensive.

In addition to the four examples of ways unauthorized users can access passwords, a combination of hardware keystroke logging devices, keystroke logging software, active monitoring, and passive monitoring may be implemented to avoid current security systems. For example, a software keystroke logging program can configure the keyboard cable to act as a transmitting antenna and send out the log in morse code, which is detected by a local inexpensive radio receiver passively monitoring the computer system from afar.

As cryptographic protection technology for entered passwords increases, keystroke logging becomes the ideal way for attackers to access passwords. As previously described, however, current methods of protecting against keystroke logging are limited. Thus, there is a need for a method, system, and program for preventing unauthorized keystroke logging that masks any patterns in password keystroke entry and avoids active and passive monitoring.

SUMMARY OF THE INVENTION

Therefore, one embodiment of the invention provides improved password security and in particular provides improved security of passwords during password entry. Further, one embodiment of the invention provides secure password entry to prevent and defeat unauthorized keystroke logging aimed at stealing passwords.

Secure password entry is facilitated by displaying a password prompt with a changing stream of random characters, where a particular character within the stream of random characters is displayed at a visibly detectable higher frequency. A user selects a password character by entering input to increment or decrement the particular high frequency character to reach the password character. Once the user reaches the password character, the user provides another input indicating a selection of the current high frequency character as the password character. Once the user has selected all the characters of the password, the user enters an input indicating the password is complete. The password entry controller then passes the password to the calling layer.

The password prompt is one character position from among multiple character positions, each displaying a changing stream of random characters, but with the prompt character position displaying a modified random stream and the other of the multiple character positions displaying true random streams. In a true random stream with a password alphabet of twenty-six characters, the stream of random characters has a probability of 1/26 of displaying an 'A' at any given instant in any given stream position. In a modified random stream, however, the random stream of characters is modified to display 'A' at a frequency greater than 1/26. The human visual system, in a process called the "gestalt effect", will detect the anomaly and see the more frequent 'A' hidden in the random stream.

The position of the password prompt among the multiple character positions may be adjusted. The user adjusts the position of the password prompt among the multiple character positions or the position of the password prompt is automatically adjusted.

The initial value of the high frequency character is randomly selected or pre-designated. In addition, the probability with which the particular character is displayed is adjustable to reach a frequency where the high frequency character is visibly detectable by the user. Further, the rate at which the stream of random characters changes is adjustable to reach a rate where the high frequency character is visibly detectable by the user.

In one embodiment, when a layer or server system requests entry of a password, the password entry controller is called to facilitate secure password entry. In another embodiment, a layer or server system requesting the password facilitates secure password entry.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
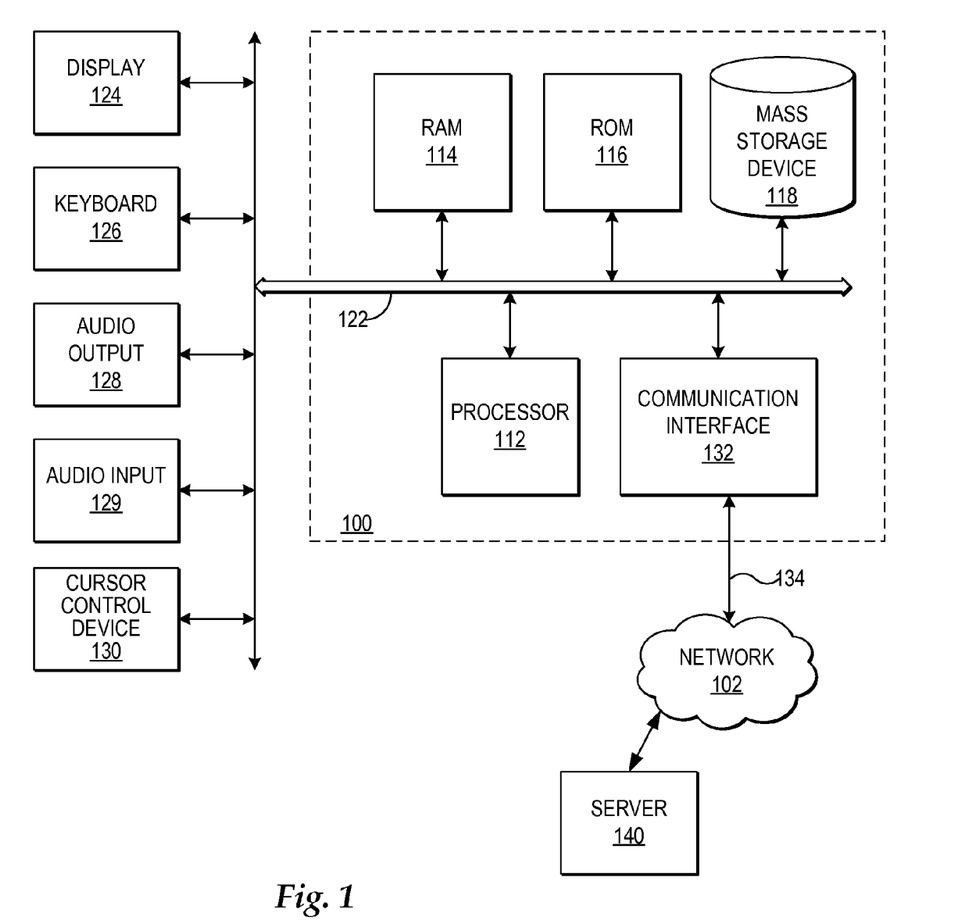
FIG. 1 is a block diagram depicting a computer system in which the present method, system, and program may be implemented.

Referring now to the drawings and in particular to FIG. 1, there is depicted one embodiment of a system through which the present method, system, and program may be implemented. The present invention may be executed in a variety of systems, including a variety of computing systems and electronic devices.

Computer system 100 includes a bus 122 or other communication device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system preferably provides a graphical user interface (GUI) to the user. In a preferred embodiment, application or operating system software contains machine executable instructions that when executed on processor 112 carry out the operations depicted in the flowchart of FIG. 5, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting computer system 100 by way of data signals embodied in a carrier wave or other propagation medium via a network link 134 (e.g. a modem or network connection) to a communications interface 132 coupled to bus 122. Communications interface 132 provides a two-way data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Network link 134 and network 102 both use electrical, electromagnetic, or optical signals that carry digital data streams. The signals through the various networks and the signals on network link 134 and through communication interface 132, which carry the digital data to and from computer system 100, are exemplary forms of carrier waves transporting the information.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

In addition, computer system 100 typically includes multiple peripheral components that facilitate communication. These peripheral components are connected to multiple controllers, adapters, and expansion slots coupled to one of the multiple levels of bus 122. For example, an audio output device 128 and audio input device 129 are connectively enabled on bus 122 for controlling audio outputs and inputs. A display device 124 is also connectively enabled on bus 122 for providing visual, tactile or other graphical representation formats and a cursor control device 130 is connectively enabled on bus 122 for controlling the location of a pointer within display device 124. A keyboard 126 is connectively enabled on bus 122 as an interface for user inputs to computer system 100. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
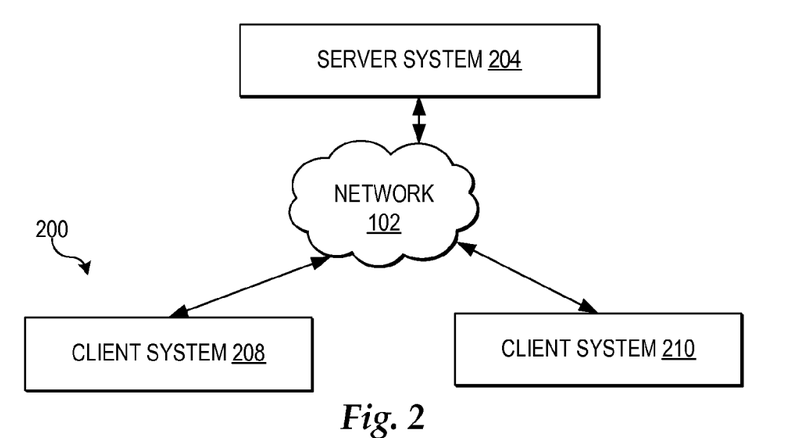
FIG. 2 is a block diagram depicting a distributed network system in which secure password entry may be provided.

With reference now to FIG. 2, a block diagram depicts a distributed network system in which secure password entry may be provided. Distributed data processing system 200 is a network of computers in which one embodiment of the invention may be implemented. It will be understood that the present invention may be implemented in other embodiments of systems enabled to communicate via a connection.

In the embodiment, distributed data processing system 200 contains network 102, which is the medium used to provide communications links between various devices and computers connected together within distributed data processing system 200. Network 102 may include permanent connections such as wire or fiber optics cables, temporary connections made through telephone connections and wireless transmission connections.

The client/server environment of distributed data processing system 200 is implemented within many network architectures. In one example, distributed data processing system 100 is the Internet with network 102 representing a worldwide collection of networks and gateways that use the TCP/IP suite of protocols to communicate with one another. The Internet is enabled by millions of high-speed data communication lines between major nodes or host computers. In another example, distributed data processing system 200 is implemented as an intranet, a local area network (LAN), or a wide area network (WAN). Moreover, distributed data processing system 200 may be implemented in networks employing alternatives to a traditional client/server environment, such as a grid computing environment.

In the depicted example, server system 204 is connected to network 102. In addition, client systems 208 and 210 are connected to network 102 and provide a user interface through input/output (I/O) devices. Server system 204 may provide multiple resources including, but not limited to, data, applications, and networks, that are accessible to client systems 208 and 210. In particular, within distributed data processing system 200, each of client systems 208 and 210 and server system 204 may include resources, function as both a "client" and a "server", and may be implemented utilizing a computer system such as computer system 100 of FIG. 1. Further, while the present invention is described with emphasis on a client system accessing resources from a server system, client systems 208 and 210 may also engage in peer-to-peer network communication and resource accessing via network 102.

For one of client systems 208 or 210 to access any of the resources of server system 204, however, server system 204 may require entry of a user identifier and password that match with a registered user identifier and password. According to an advantage of the present invention, when a system within distributed data processing system 200 requires a password for access to a resource, a secure password entry controller may be initiated by the client system or server system. The secure password entry controller facilitates password entry such that the risk of unauthorized keystroke logging resulting in password detection is minimized. In particular, unless an attacker uses expensive and difficult to execute logging methods, such as a high fidelity video recorder which records the computer monitor and the user's hands over the keyboard or a high fidelity passive monitoring device which can reconstruct the contents of the user's computer screen and a hardware or software keystroke logger which records precise timestamps, the secure password entry controller ensures secure password entry. More importantly, the secure password entry controller provides enhanced security against "shoulder-surfers" for laptops and other computer systems located in public areas, such as an airport.

It is also important to note that in addition to a server system requiring a client system to provide a password, each individual system within distributed data processing system 200 may require entry of a password by the user requesting access to resources available at that individual system. In particular, different software layers within a particular system may require a password for a user at the particular system to access a resource available at the particular system. For example, client system 208 may prompt a user for a password at power-on.

Figure 3:
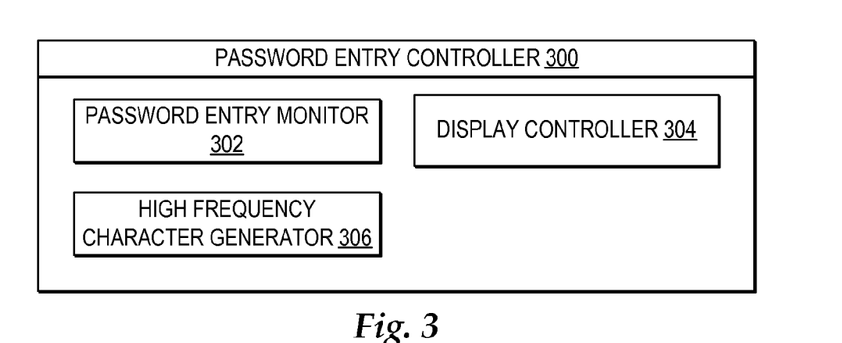
FIG. 3 is a block diagram depicting a password entry controller in accordance with the method, system, and program of the present invention.

Referring now to FIG. 3, there is depicted a block diagram of a password entry controller in accordance with the method, system, and program of the present invention. As depicted, a password entry controller 300 preferably includes a high frequency character generator 306. High frequency character generator 306 generates a random stream of characters modified so that one character is displayed at a higher frequency. In particular, the high frequency character is displayed with a frequency such that the high frequency character is detectable by a user watching a display of the random character stream. In particular, the human vision system, in a process called the "gestalt effect", will detect the anomaly and see the high frequency character The initial value of the high frequency character may be randomly selected or predetermined. Further, a subset of characters may be designated as high frequency characters to be randomly selected, such that a user can expect the high frequency character to be one from among the subset of characters. Moreover, the high frequency character may be selected such that it is always within a particular range of characters away from the password character.

A display controller 304 controls the display of the random character stream in a password prompt field. Preferably, the rate and frequency percentage at which each character of the random character stream is displayed is also managed such that a user can visibly detect the high frequency character.

Password entry monitor 302 detects keystrokes entered by the user to increment or decrement the high frequency character to select a character of the password. Then, password entry monitor 302 detects when the user enters another keystroke to select the password character. The user repeats the process of incrementing or decrementing the high frequency character to select each character of the password. When all the characters of the password are selected, password entry monitor 302 detects when the user enters a keystroke to complete the password entry. Then, password entry monitor 302 securely passes the completed password to a requesting layer.

By implementing password entry controller 300 to provide secure password entry, an unauthorized keystroke logger who intercepts an authorized user's keystrokes will see or hear only the control characters which, if anything, show only the length of the user's password. Thus, hardware, software, and aural keystroke logging devices are rendered ineffective when password entry controller 300 is implemented.

It is important to note that while the present invention is described with reference to entry of a password at a display, entry of a password through a voice-automated system may also be facilitated through the present invention. In particular, the stream of random characters with a high frequency character may be converted from text into voice and output via a speaker and the inputs to increment or decrement the high frequency character and indicate character and password completion may be detected from a microphone and converted from voice into text.

Table 1 illustrates one example of programming for the components of password entry controller 300 in the C programming language for the GNU/Linux platform. Those of ordinary skill in the art will appreciate that the programming depicted in Table 1 may vary. Furthermore, those of ordinary skill in the art will appreciate that the depicted example in not meant to imply programming limitations with respect to the present invention.

TABLE 1

```
#include <ncurses.h>
#include <studio.h>
#include <stdlib.h>
#include <time.h>
#include <unistd.h>
int
pov_getpass (char *pass, int size, int cols, int seed)
{
    char c, x. y;
    int i, j, n, p;
    srand (seed)
    x = (rand ( ) % 26) + 'A';
    y = rand ( ) % cols;
    initscr ( );
    noecho ( );
    halfdelay (1);
    for (i = 0, p = 0, n = 50; p < size, i = rand ( ) % 100)
        {
            for (j = 0, mvprintw (0, 0, "Password: "); j < cols; j++)
                printw ("%-2c", (j == y && i < n) ? x: (rand ( ) %
                26) + 'A');
            if ((c = getch ( )) == '\n')
                break;
            else if (c == 'i')
                {
                    pass[p++] = x;
                    pass[p] = '\0';
                }
            else if (c == 'J')
                n = (n == 0) ? 0 : n – 10;
            else if (c == 'K')
                n = (n == 100) ? 100 : n + 10;
            else if (c == 'j')
                x = (x == 'A') ? 'Z' : x – 1;
            else if (c == 'k')
                x = (x == 'Z') ? 'A' : x + 1;
            else if (c == 'h')
                y = (y == 0) ? cols – 1 : y – 1;
            else if (c == 'l')
                y = (y == cols – 1) ? 0 : y + 1;
        }
    endwin ( );
    return p;
}
int
main (int argc, char **argv)
{
    char pass[256];
    if (pov_getpass (pass, sizeof (pass), 4, time (NULL)) <= 0)
        return 1;
    printf ("%s", pass);
    return 0;
}
```

Figure 4:
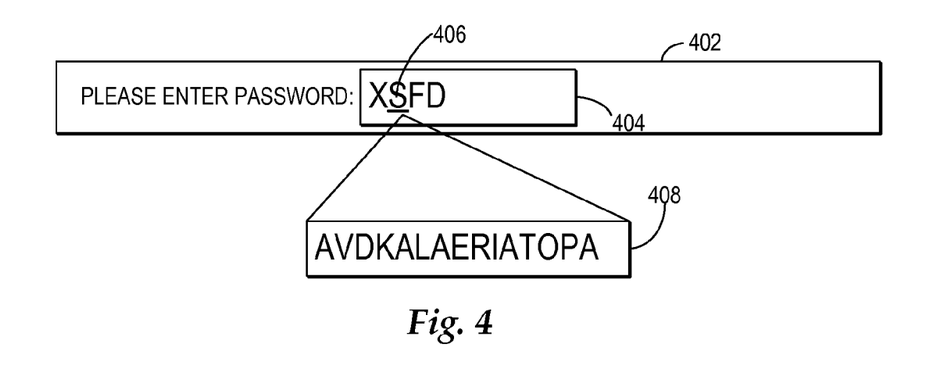
FIG. 4 is a pictorial representation of a secure password entry display in accordance with the method, system, and program of the present invention.

With reference now to FIG. 4, there is depicted a pictorial representation of a secure password entry display interface in accordance with the method, system, and program of the present invention. As depicted a display area 402 includes a prompt field 404 for a user to enter a password. It will be understood that display area 402 may be implemented within multiple types of display interfaces with multiple types of graphical capabilities.

Within display area 402, prompt field 404 displays four character positions, where the number of character positions in prompt field 404 may be specified by the program calling for the password prompt or by the user specifying a number of character positions, for example. As the number of character positions increases from one to 25, for example, the complexity of tracking the password entry increases. It will be understood that while prompt field 408 displays character positions in four columns, other configurations of character positions may be implemented. For example, the character positions may be configured in one vertical column or other patterns that increase the complexity of monitoring password entry.

In the example, the second character position is specified as the current prompt position 406. Advantageously, as a user is entering a password, the user may adjust the current prompt position to any of the character positions in prompt field 404. For purposes of illustration, current prompt position 406 is further indicated by underlining the character in that position, however, when implementing the present invention it may be disadvantageous to indicate the current prompt position by underlining or other graphical indicator. Instead, preferably, the frequency at which a high frequency character is displayed in the current prompt position will allow the user to detect the current prompt position.

At each character position, randomly generated characters are streamed at a particular rate. According to an advantage of the present invention, in current prompt position 406, a modified stream of the random characters are generated and displayed where one character is generated with a distinguishably higher frequency than the other characters. In particular, the modified random characters preferably stream through current prompt position 404 at a rate and frequency percentage where the high frequency character is visually distinguishable to the user looking at the display. For example, random character stream 408 depicts the random characters that might be generated and displayed within current prompt position 404, where the character "A" is visually distinguishable as the high frequency character.

Advantageously, a user may elect to increase or decrease the probability that the high frequency character will be displayed instead of a random character by increasing or decreasing the frequency percentage. In the example, the frequency percentage is set so that there is a 33 percent probability that the high frequency character "A" is displayed instead of a random character, however, that percentage may be increased or decreased. For example, a user who is having a difficult time visually distinguishing the high frequency character may increase the frequency percentage to 50 percent so that there is a probability that the high frequency character will be displayed roughly half of the time. In another example, a user who is easily able to detect the pattern at a 33 percent frequency may decrease the frequency percentage to increase the difficulty for a shoulder surfer to detect the password entry.

It is important to note that the frequency percentage is a rough estimate and thus the actually frequency at which the high frequency character is displayed is still subject to random chance. Otherwise in the example where the frequency percentage is set to 33 percent, a video recorder could be configured to record frames at some multiple of 3 Hz and easily discover the high frequency character. As illustrated in Table 1, one way of generating the modified random character string with a high frequency character is by checking a random number. If the random number is greater than a particular threshold set by the frequency percentage, then the stream is modified and the high frequency character is displayed; otherwise the randomly generated character is displayed. As a result, if the threshold percentage is set to 33 percent, then the high frequency character will be displayed roughly one-third of the time, however preferably not in a deterministic sequence.

Further, advantageously, a user may select to increase or decrease the rate at which the characters stream in each character position to aid the user in visually distinguishing the high frequency character. For example, while it is considered optimal to display streaming characters at 10 Hz, for some users the rate may be too fast or too slow. Further, to increase the complexity of monitoring password entry, the rate at which the characters stream in different character positions may be adjusted.

Once a user detects which column contains the high frequency character, the user then enters keystrokes to increment or decrement the high frequency character to select a character of the password. In the example, if the first character of the password is "C", then the user would enter two keystrokes to increment the high frequency character from "A" to "C".

Once a user adjusts the high frequency character to a password character, the user enters a keystroke to indicate the character selection. Then, once a user completes the password character selections, the user enters a keystroke to indicate the password is complete. The password entered will be passed to the requesting layer.

It is important to note that the user may be notified of the keystrokes for incrementing or decrementing the high frequency character, indicating character selection, and indicating password completion through instructions in display area 402 or from another information source. For example, an electronic communication each day or week may specify the keystroke characters for entering a password that day or week. Further, it is important to note that the keystroke characters may be randomly selected for each password entry to further avoid password tracking.

Figure 5:
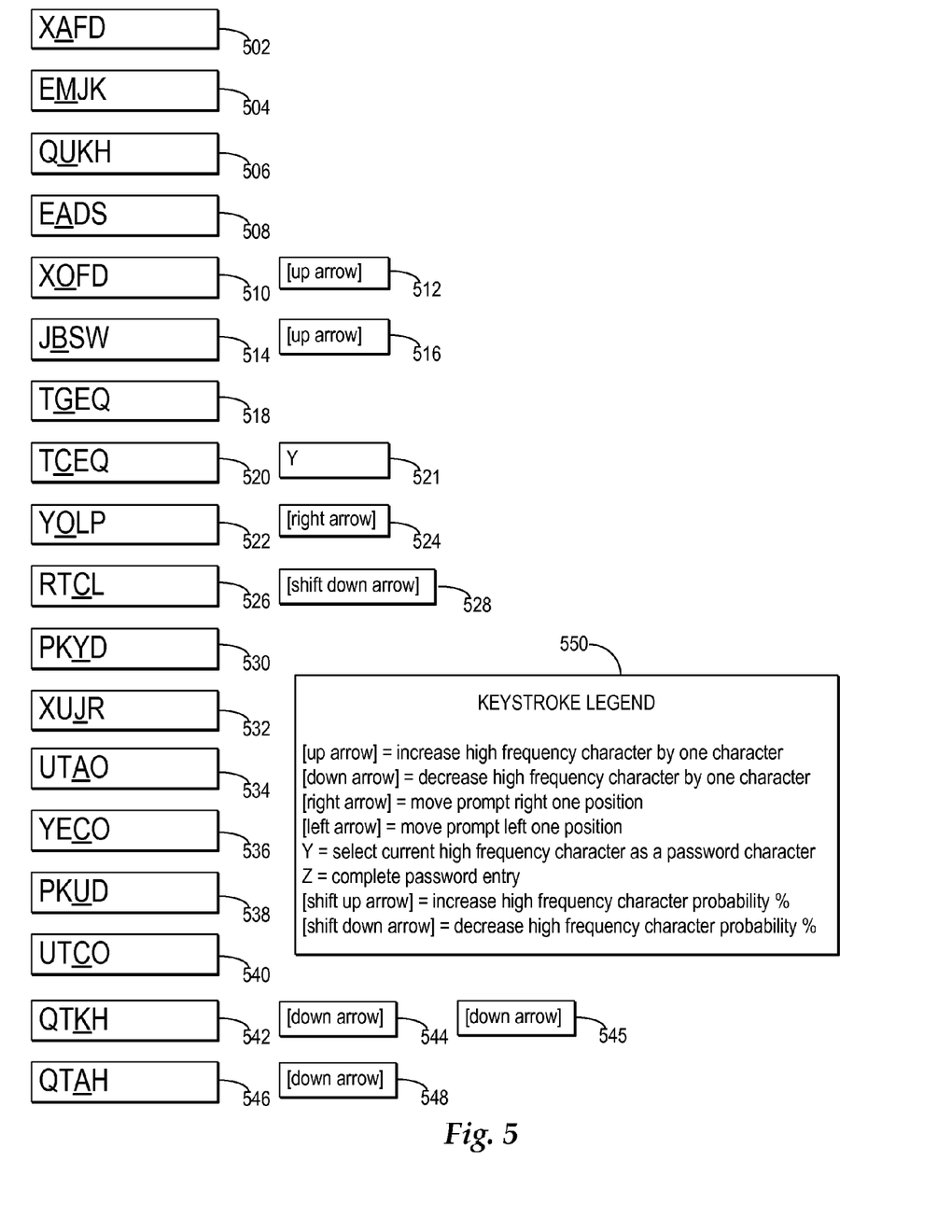
FIG. 5 is a pictorial representation of a secure password entry sequence in accordance with the method, system, and program of the present invention.

With reference now to FIG. 5, there is depicted a pictorial representation of a secure password entry sequence in accordance with the method, system, and program of the present invention. A keystroke legend 550 indicates the type of functions invoked by different types of keystrokes. It will be understood that keystroke legend 550 is depicted for purposes of illustrating the types of functions that can be performed, but is only an example of the types of keystroke assignments that may be made. Furthermore, it will be understood that in addition to keystrokes, other types of input may be received to perform the functions available during secure password entry.

In the example, a sequence of the characters within the prompt field and the keystrokes entered by a user are depicted. The prompt fields include four character positions, and, in the prompt character position, the high frequency character "A" is initially displayed at a frequency percentage of roughly 50 percent. In particular, at reference numeral 502, the prompt field includes four character positions with the second character position indicated as the current prompt position. As previously described, for purposes of illustration, the character in the current prompt position is indicated by a line under the character. At reference numerals 504 and 506, each character position displays a different character in the streams of random characters. Then, at reference numeral 508, the current prompt position contains the high frequency character "A"

At reference numeral 510, each character position displays a different character in the streams of random characters and the user enters a keystroke as illustrated at reference numeral 512. The keystroke entered is an "up arrow." Responsive to the keystroke, the high frequency character increases by one character from "A" to "B". In the example, when the streaming random characters change, the high frequency character is displayed in the current prompt position, as depicted at reference numeral 514. The user then enters another "up arrow" keystroke as depicted at reference numeral 516. Responsive to the keystroke, the high frequency character is incremented from "B" to "C". The high frequency character is not displayed in the current prompt position in the next stream change depicted at reference numeral 518, but is displayed in the current prompt position at reference numeral 520. Then the user enters a "Y" keystroke as depicted at reference numeral 521 and the current high frequency character "C" is selected as the first character of the password.

At reference numeral 520, the modified random stream of characters continues to be displayed in the current prompt position with the high frequency character of "C". As illustrated at reference numeral 524, the user enters a "right arrow" keystroke and in response, at reference numeral 526, the current prompt position is shifted one position to the right. Then, the user enters a "shift down arrow" as depicted at reference numeral 528. In response, as depicted at reference numerals 530, 532, 534, 536, 538, 540, and 542, the frequency percentage at which the high frequency character "A" is displayed decreases from a roughly 50 percent probability to a roughly 33 percent probability. Then, responsive to the user entering "down arrow" keystrokes as depicted at reference numerals 544 and 545, the high frequency character is decremented two characters from "C" to "A". At reference numeral 546, the current high frequency character "A" is displayed in the current prompt position. Responsive to the user entering another "down arrow" keystroke as depicted at reference numeral 548, the high frequency character is decremented from "A" to "Z". The user can continue to increment and decrement the high frequency character, select password characters, move prompt positions, adjust the frequency percentage, and provide other inputs while securely entering a complete password. It is important to note that while the present example uses uppercase alphanumeric characters, the stream of random characters may include uppercase and lowercase alphanumeric characters and numerals.

Figure 6:
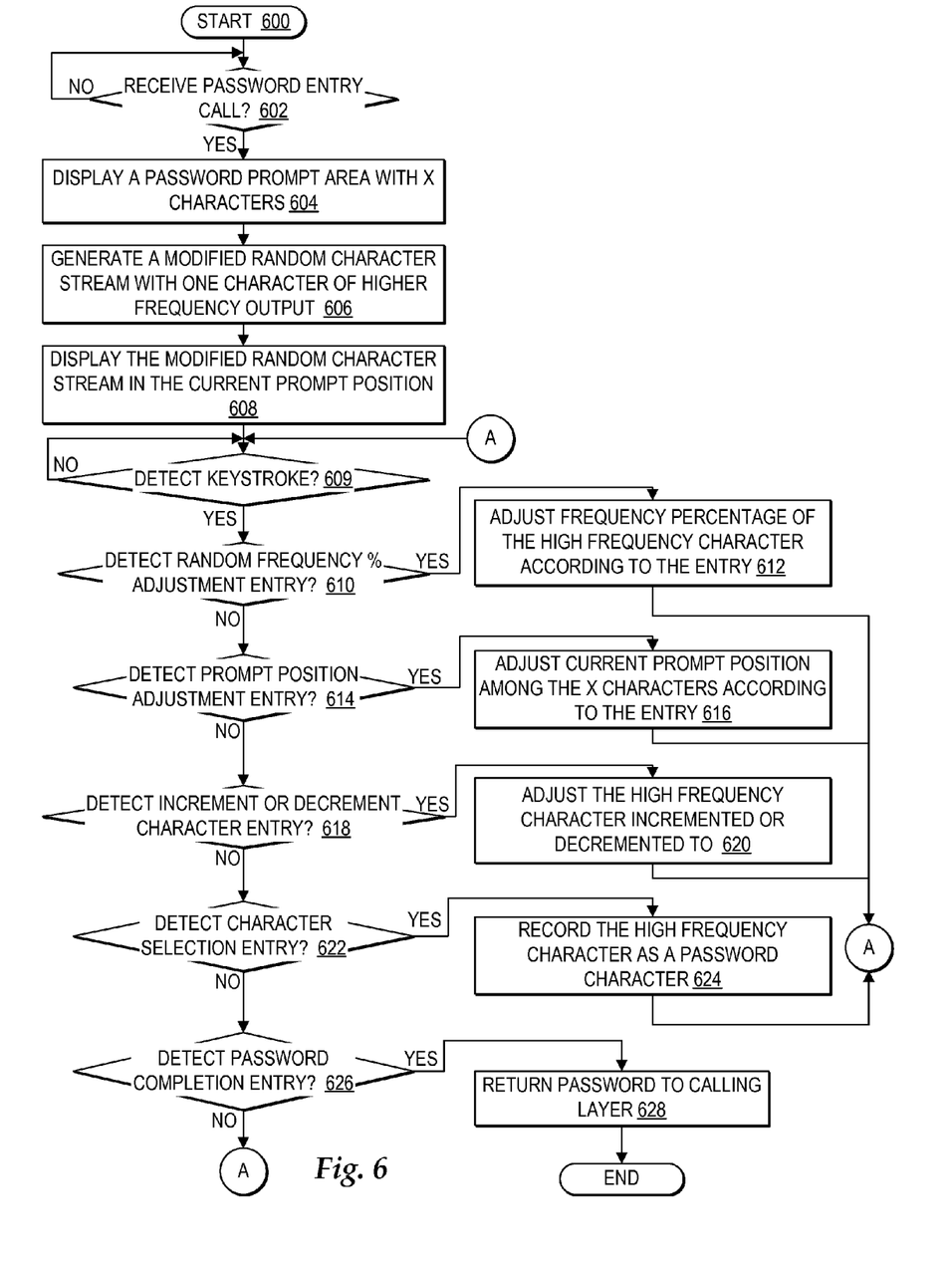
FIG. 6 is a high level logic flowchart of a process and program for controlling secure password entry in accordance with the method, system, and program of the present invention.

Referring now to FIG. 6, there is depicted a high level logic flowchart of a process and program for controlling secure password entry in accordance with the method, system, and program of the present invention. As depicted, the process start at block 600 and thereafter proceeds to block 602. Block 602 depicts a determination whether a password entry call is received. Preferably, any program which needs a prompt for a password can call the password entry process. Alternatively, the process may be called by other methods. For example, in a UNIX system, the process may be called as a subroutine from a library. If a password entry call is not received, then the process iterates at block 602. If a password entry call is received, then the process passes to block 604. Block 604 depicts displaying a password prompt area with X characters. For example, the user may define the number of characters or the program calling the secure password process may pass a value defining the number of characters to be displayed in the prompt area. Next, block 606 depicts generating a random character stream with one character output at a higher frequency. The user may define the frequency percentage of the high frequency character or the program calling the secure password process may pass an initial value setting the frequency percentage. Alternatively, a default percentage may be initially used to determine the frequency percentage of the high frequency character within the random character stream. Thereafter, block 608 depicts displaying the random character stream in the current prompt position and the process passes to block 609. Initially, the current prompt position may be designated at a random position within the X characters of the password prompt. Block 609 depicts a determination whether a keystroke or other input is detected. If a keystroke or other input is not detected, then the process iterates at block 609. If a keystroke or other input is detected, then the process passes to block 610.

Block 610 depicts a determination whether a frequency percentage adjustment entry is received. If a frequency percentage adjustment entry is received, then the process passes to block 612. Block 612 depicts adjusting the frequency percentage of the high frequency character according to the entry, and the process passes to block 609. Alternatively, at block 610, if no frequency percentage adjustment entry is received, then the process passes to block 614.

Block 614 depicts a determination whether a prompt position adjustment entry is received. If a prompt position adjustment entry is received, then the process passes to block 616. Block 616 depicts adjusting the current prompt position among the X characters according to the entry and the process passes to block 609. Alternatively, at block 614, if the keystroke is not a prompt position adjustment entry, then the process passes to block 618.

Block 618 depicts a determination whether the keystroke detected is for incrementing or decrementing characters. If the keystroke detected is for incrementing or decrementing characters, then the process passes to block 620. Block 620 depicts adjusting the high frequency character by incrementing or decrementing one character from the current high frequency character, and the process passes to block 609. Alternatively, at block 618, if the keystroke is not an increment or decrement character entry, then the process passes to block 622.

Block 622 depicts a determination whether a character selection keystroke is received. If a character selection keystroke is received, then the process passes to block 624. Block 624 depicts recording the current high frequency character as the selected password character, and the process returns to block 609. Alternatively, at block 622, if the entry is not a character selection keystroke, then the process passes to block 626.

Block 626 depicts a determination whether the keystroke is a password completion entry. If the keystroke is not a password completion entry, then the process returns to block 609. If the keystroke is a password completion entry, then the process passes to block 628. Block 628 depicts returning the password to the calling layer, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system for secure password entry, comprising:
   a data processing system for controlling a display interface;
   said data processing system operative to display a password prompt comprising a changing stream of random characters within said display interface, wherein a particular character within said changing stream of random characters is displayed at a visibly detectable higher frequency; and
   said data processing system operative to receive input at said data processing system to increment or decrement said particular character to reach a password character of a password.

2. The system according to claim 1 for secure password entry, further comprising said data processing system operative to display a plurality of character positions, wherein a stream of random characters is displayed in each of said plurality of character positions, wherein a particular position from among said plurality of character positions provides said password prompt.

3. The system according to claim 2 for secure password entry, further comprising said data processing system operative to adjust which character position from among said plurality of character positions provides said password prompt.

4. The system according to claim 2 for secure password entry, further comprising said data processing system operative to adjust a number of said plurality of character positions.

5. The system according to claim 1 for secure password entry, further comprising:
said data processing system, responsive to receiving input of a character selection input selecting said particular character, operative to select said particular character as said password character from among a plurality of separately selectable password characters of said password; and
said data processing system, responsive to receiving input of a password completion character indicating that said password is complete, operative to securely pass each separately selected password character of said password to a requesting software layer.

6. The system according to claim 1 for secure password entry, further comprising:
a password entry controller executing within said data processing system for controlling display of said password prompt and receiving input at said data processing system; and
said data processing system, responsive to receiving a request for a password from a software layer within said data processing system, operative to invoke said password entry controller.

7. The system according to claim 1 for secure password entry, further comprising:
a password entry controller for controlling display of said password prompt and receiving input at said data processing system; and
said data processing system, responsive to receiving a request for a password from a server system from which said data processing system is attempting to accessing a resource, operative to invoke said password entry controller.

8. The system according to claim 1 for secure password entry, further comprising:
said data processing system operative to generate said string of random characters, wherein said particular character is randomly selected.

9. The system according to claim 1 for secure password entry, further comprising: said data processing system operative to adjust frequency percentage at which said particular character is displayed in said stream of random characters.

10. A computer program product for secure password entry, residing on a non-transitory computer readable medium comprising instructions which when executed on a computer system cause the computer system to:
display a password prompt comprising a changing stream of random characters, wherein a particular character within said changing stream of random characters is displayed at a visibly detectable higher frequency; and
receive input to increment or decrement said particular character to reach a password character of a password.

11. The computer program product according to claim 10 for secure password entry, said instructions which when executed on a computer system further causing said computer system to:
display a plurality of character positions, wherein a stream of random characters is displayed in each of said plurality of character positions, wherein a particular position from among said plurality of character positions provides said password prompt.

12. The computer program product according to claim 10 for secure password entry, said instructions which when executed on a computer system further causing said computer system to:
adjust which character position from among said plurality of character positions provides said password prompt.

13. The computer program product according to claim 10 for secure password entry, said instructions which when executed on a computer system further causing said computer system to:
adjust a number of said plurality of character positions.

14. The computer program product according to claim 10 for secure password entry, said instructions which when executed on a computer system further causing said computer system to:
responsive to receiving input of a character selection input selecting said particular character, select said particular character as said password character from among a plurality of separately selectable password characters of said password; and
responsive to receiving input of a password completion character indicating that said password is complete, securely pass each separately selected password character of said password to a requesting software layer.

15. The computer program product according to claim 10 for secure password entry, said instructions which when executed on a computer system further causing said computer system to: generate said stream of random characters, wherein said particular character is randomly selected.

16. The computer program product according to claim 10 for secure password entry, said instructions which when executed on a computer system further causing said computer system to:
adjust a frequency percentage at which said particular character is displayed in said stream of random characters.

* * * * *